Figure 1:
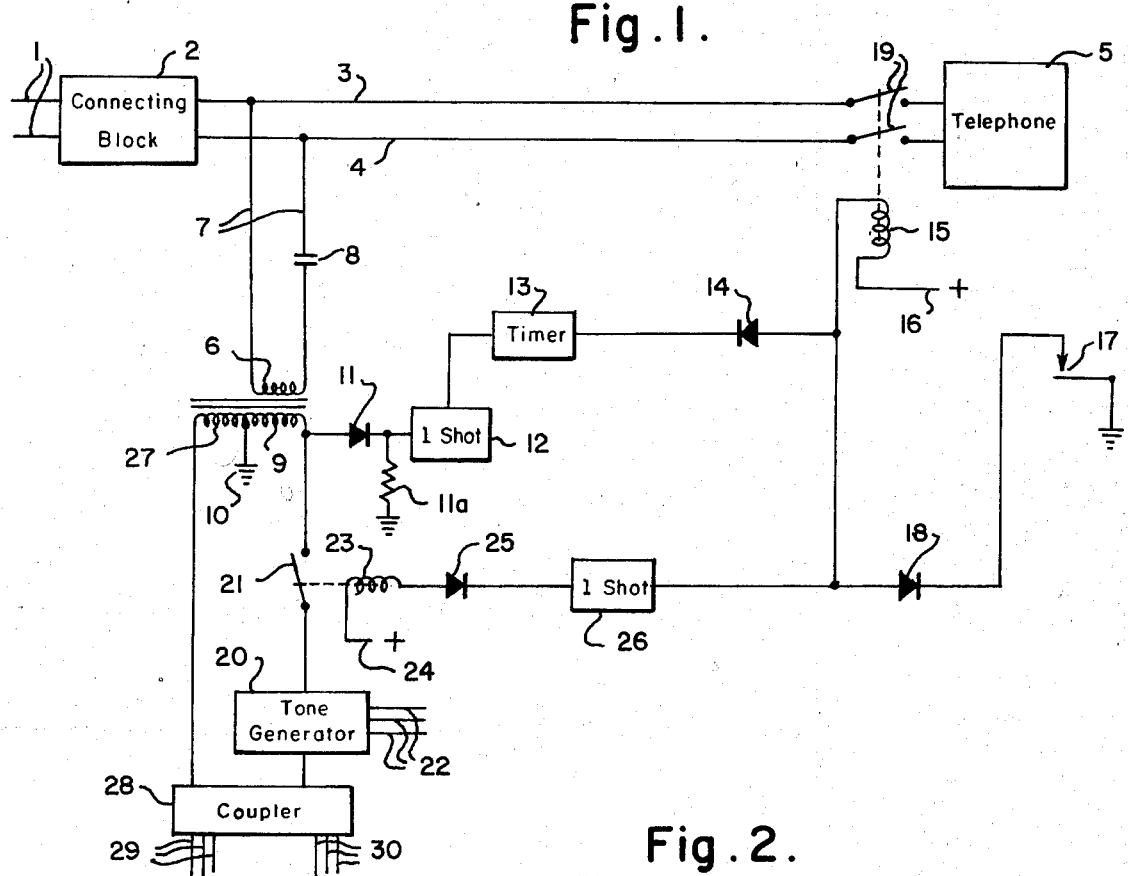

United States Patent [19]

Walker

[11] 4,355,205
[45] Oct. 19, 1982

[54] TELEMETERING SYSTEM

[75] Inventor: Harold R. Walker, Middlesex, N.J.

[73] Assignee: Frank E. Lowe, Pittsburgh, Pa.

[21] Appl. No.: 172,028

[22] Filed: Jul. 24, 1980

[51] Int. Cl.³ .......................................... H04M 11/00
[52] U.S. Cl. ............................... 179/2 A; 179/2 AM
[58] Field of Search .................. 179/2 R, 2 A, 2 AM, 179/1 MN; 340/150, 151, 147 R

[56] References Cited

U.S. PATENT DOCUMENTS 3,912,882 10/1975 Beerbaum ........................... 179/2 A
4,016,360 4/1977 Cane .................................... 179/2 A Primary Examiner—Joseph A. Popek
Attorney, Agent, or Firm—Buell, Blenko, Ziesenheim & Beck

[57] ABSTRACT

A telemetering system useful for telephone installations. A normally open switch is placed between the line and telephone set. A ringing signal permits sensing apparatus to deliver a coded message to the line between the first and second rings, and the normally open switch is closed before the second ring. Ordinarily calls are delayed for the period of one ring and calls seeking data collection are disconnected before the normally open switch closes. Alternatively data may be delivered to a station associated with the telephone set.

5 Claims, 2 Drawing Figures

TELEMETERING SYSTEM

This application relates to telemetering systems associated with ordinary telephone installations. More particularly, it relates to telemetering systems by which data may be obtained from and communicated to a communicating device associated with an ordinary telephone installation.

The use of data communication is becoming increasingly more common. In most commercial uses data are transmitted by telephone circuits. In some instances leased lines are used and in other instances couplers may be provided at each end of a telephone circuit. Numerous other uses of data transmission are possible. It may be desired periodically to monitor information at a remote location. For example, it may be desired periodically to check indoor and outdoor temperatures at a remote structure or a refrigerated space. Utility meter readings and smoke concentrations within buildings might also be monitored. Since existing telephone lines may be used, investment in new equipment is limited to sensors and to couplers at a central station and at the locations to be monitored. It is also possible periodically to monitor a television to determine the station to which the set is tuned thereby providing for a broad based and controlled sample of television equipped households at low cost.

Such examples involve collecting and transmitting data from widely separated points to a central station. It is also possible, however, to reverse the process so that information is transmitted from a central point to a widely scattered variety of locations. Such transmission could be used to verify data which have been transmitted and to activate control equipment at the remote location. The central station could for example distribute to television subscribers information regarding programming, etc. Selected television receivers might be switched to different program material temporarily to enable controlled viewing of selected program material such as commercials and announcements. Since the viewing can be precisely controlled, follow-up and inquiry as to impact can be done precisely.

I provide a telemetering system for use with a telephone installation, including a telephone set and normally open switch means between the set and the line. I further provide switch means operated by a ringing signal on the line and imposing a responding signal on the line momentarily and thereafter closing the first switch means for normal connection of the telephone set to the line. I prefer to provide timer means operated by the ringing signal which operate to connect the telephone set to the line. I further prefer to provide sensor means and signal generator means associated therewith for delivering a coded signal onto the telephone line.

Other details, objects and advantages of my invention will become more apparent as the following description of a present preferred embodiment thereof proceeds.

Figure 2:
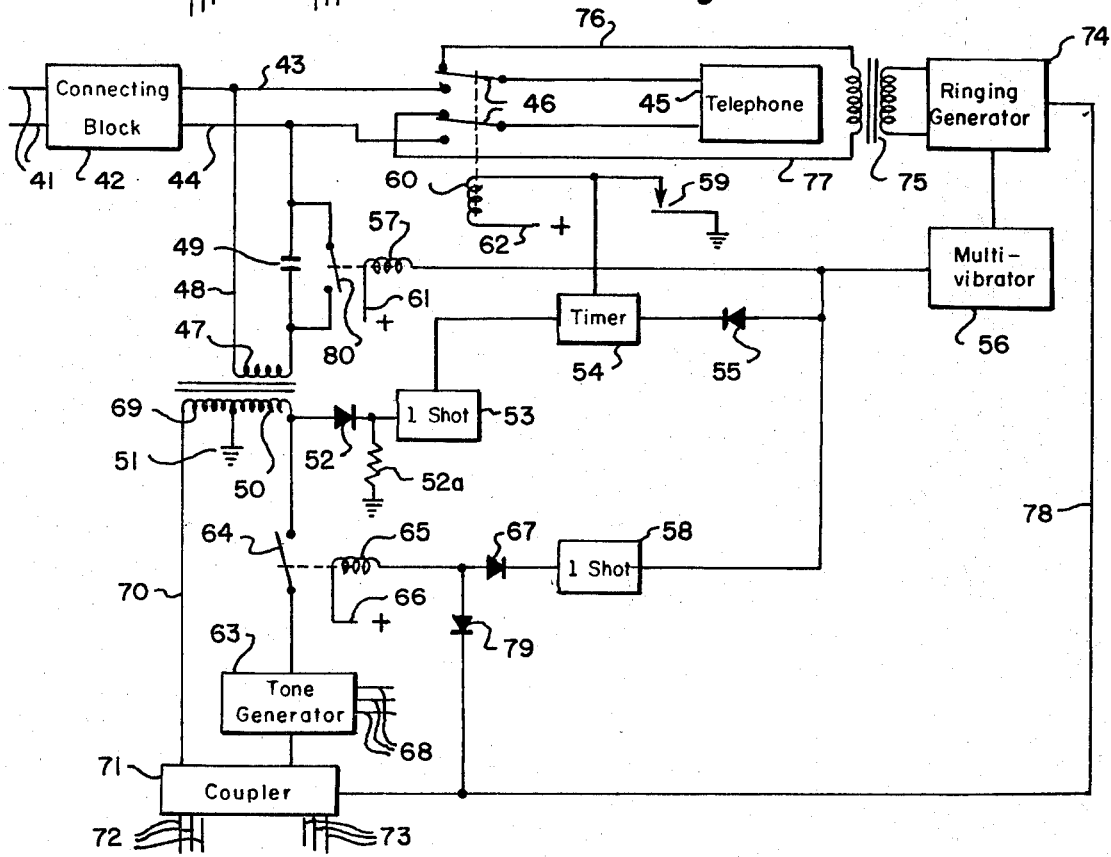

In the accompanying drawings I have illustrated a present preferred embodiment of my invention in which:

FIG. 1 is a schematic circuit diagram of a telephone and associated equipment embodying my invention; and FIG. 2 is a schematic circuit diagram of another type of telephone installation having associated equipment embodying my invention.

Referring to FIG. 1 a conventional telephone line consisting of a pair of wires 1 terminates in a standard connecting block 2. The circuit is continued through wires 3 and 4 to a conventional telephone set 5. The primary winding 6 of a transformer is connected to wires 3 and 4 by wire 7. A capacitor 8 is introduced into the circuit to prevent passage of direct current. A secondary winding of the transformer 9 is connected from a ground 10 through a diode 11 and a resistor 11a to a retriggerable one-shot transistorized logic unit 12. An output of logic unit 12 is connected to a long duration transistorized time delay unit 13. Timer 13 is connected through a diode 14 to a relay coil 15 which is in turn connected to a power source 16. An off hook contact 17 is closed when the receiver is lifted from the telephone. When contact 17 is closed a circuit is completed from relay coil 15 through a diode 18 to ground. Operation of relay 15 will close switch points 19 connecting telephone 5 to connecting block 2 through wires 3 and 4.

A tone generator 20 is connected to transformer secondary winding 9 through a switch 21. Input wires 22 are provided from various sensing devices. Switch 21 is controlled by a relay having a winding 23 which is connected from a power supply 24 through a diode 25 to a retriggerable one shot transistorized logic unit 26. Logic unit 26 is connected to timer 13 through diode 14.

Another transformer secondary winding 27 is provided in series with winding 9 and connects a coupler 28 to transformer. Inputs 29 and outputs 30 are provided from coupler 28.

A modified form of the invention is shown in FIG. 2. Telephone wires 41 from an ordinary line are connected through a connecting block 42 to wires 43 and 44. A telephone 45 may be connected to wire 43 and 44 through a double pole switch 46. A primary transformer winding 47 is connected to wires 43 and 44 by wires 48. A capacitor 49 is connected in one of wires 48 to prevent passage of direct current. A secondary transformer winding is connected from a ground 51 through a diode 52 and resistor 52a to a retriggerable one shot transistorized logic unit 53. An output of logic unit 53 is connected to a timer 54. Timer 54 is connected through a diode 55 to a multivibrator 56 to a coil 57 of a relay and to a retriggerable one shot transistorized logic unit 58. Timer 54 is also connected to an off hook contact 59 and to a relay coil 60. Relay coils 57 and 60 are connected to power supply 61 and 62, respectively.

A tone generator 63 is connected to transformer secondary winding through a switch 64. Switch 64 is closed by operation of a relay having a coil 65 which is connected to a power supply 66 and connects through a diode 67 to one shot logic unit 58. Inputs 68 are provided for tone generator 63. A secondary transformer winding 69 is connected in series with winding 50. A connection is completed through wires 70 to a coupler 71. Coupler 71 has input leads 72 and output leads 73.

A ringing generator 74 is connected to multivibrator 56. Ringing generator 74 supplys a ringing signal through transformer 75 to wires 76 and 77 and complete a ringing signal through telephone 45 when switch 46 is in position to complete a connection from transformer 75 through wires 76 and 77 to telephone 45.

Ringing generator 74 is powered through a wire 78 supplied from power source 66 through a diode 79. Wire 78 may also be grounded through coupler 71.

In operation of the apparatus in FIG. 1 a DC voltage will normally be imposed across wires 3 and 4. When a ringing signal is imposed on wires 1 it will not be transmitted to telephone 5 because switch 19 is open. The ringing signal is an alternating voltage which will pass through transformer primary winding 6 and will induce a current in secondary winding 9. Diode 11 converts the ringing signal into a series of pulses which triggers logic unit 12. Logic unit 12 will have an output voltage as long as the pulses continue. At the cessation of the first ringing signal the voltage shifts causing timer 13 to set and to permit current to flow from power supply 16 through coil 15 and diode 14 thereby closing switch points 19. The second ringing signal will then be transmitted to telephone 5 in the normal manner. Timer 13 will stay set for a period of about ten rings. If the telephone is answered within that period off-hook switch contact 17 will close when the hand set is lifted thereby continuing to energize relay 15 for the duration of the call. If telephone 5 is now answered within the period fixed by timer 13 the timer will reset thereby breaking the circuit through relay coil 15 and allowing switch points 19 to open.

Setting of timer 13 also energizes one shot logic unit 26 to complete a circuit from power supply 24 through relay coil 23 and diode 25. Energizing of coil 23 causes switch 21 to open thereby connecting tone generator 20 through the circuit which also primary winding 9. Signals supplied through input 20 may then be fed onto the telephone line to the calling office. Timer 13 starts at the end of the first ring and delays for almost the full period between rings. Thus, switch 19 is not closed until after the response has been placed on the line and just prior to the second ringing signal.

If the central data collection office wishes to obtain information it calls the location to be interrogated. At the end of the first ring and before the commencement of the second ring switch 21 is closed and data are transmitted from tone generator 20 back to the calling office. The calling office then hangs up breaking the circuit with the result that there is no audible ring at telephone 5. If an ordinary call for voice communication is placed the first ring will be diverted as in the case of a data communication inquiry. The second ring will then be transferred to the telephone for answer in the normal manner.

It is also possible to issue instructions which are transmitted from the calling office after the first ringing signal and which are received by coupler 28. Input and output leads 29 and 30 permit further data transmission as may be desired.

In some telephone exchange equipment it is not possible to use the line for two way communications before pickup. Accordingly, a ringing signal is imposed upon the telephone and a switch is closed across the line to permit use of the line for two way conversation. When a ringing signal is applied to wires 41 as shown in FIG. 2 the ringing signal is transmitted from wires 43 and 44 through primary transformer winding 47. One shot logic unit 53 activates timer 54 as soon as the ringing signal ends. Timer 54 is set to complete a circuit from power supply 61 through relay coil 57 thereby closing associated switch 80 thereby completing a DC connection across wires 43 and 44. At the same time, timer 54 energizes multi-vibrator 56 and one shot logic unit 58 which causes coil 65 to be energized thereby closing switch 64. Signals supplied on input leads 68 to tone generator 63 are thereby fed to the transformer secondary winding 50 and can be fed back to the calling office through wires 41.

Multi-vibrator 56 controls operation of ringing generator 74 which will impose a ringing signal through transformer 75 on wires 76 and 77. There will, however, be a delay period which enables data transmission from tone generator 63 back to the calling office. At the completion of data transmission the calling office disconnects and no further ringing occurs, thereby causing timer 54 to reset and allowing switch 80 to open and to discontinue operation of multi-vibator 56 before an audible ring is produced at the telephone.

If a conventional call is coming in the apparatus will work as just described until the hand set is lifted thereby closing off-hook switch contact 59. Relay coil 60 is thereby energized thereby through switch 46 and connecting telephone 45 to wires 43 and 44. Closing of off-hook contact 59 will also disconnect timer 54 thereby stopping the ringing signal.

Coupler 71 may be used to carry interrogations from the calling station and also to return additional data responsive to those communications. Coupler 71 can be used to ground wire 78 thereby cutting off to ringing generator 74 and permitting more extended interrogation if required.

While I have illustrated described certain present preferred embodiments of my invention it is to be understood that I do not limit myself thereto and that my invention may be otherwise variously practiced within the scope of the following claims.

I claim:

1. A telemetering system for use with a telephone installation comprising normally open first switch means connected between a telephone set and telephone line, second switch means connected to the line and operable by a ringing signal on the line, said second switch means being operated by a ringing signal to impose a responding signal on the line momentarily and thereafter to close the first switch means and connect the telephone set to the line.

2. A telemetering system for use with a telephone installation comprising normally open first switch means connected between a telephone set and telephone line, normally open second switch means connected between the line and tone generator means, ringing signal sensing means connected to the line and to the second switch means, a ringing signal on the telephone line causing the ringing signal sensing means to close the second switch means when a ringing signal is detected, timer means connected to the ringing signal sensing means and to the first switch means for closing of the first switch means a controlled time after a ringing signal is sensed.

3. A telemetering system as set forth in claim 2 in which closing of an off-hook switch at the telephone set holds the first switch means in closed position.

4. A telemetering system as set forth in claim 2 in which the tone generator is connected to the telephone line through the second switch means.

5. A telemetering system for use with a telephone installation including a telephone set and telephone line, said telemetering system comprising ringing signal sensing means connected to the telephone line, first normally open switch means connected between the telephone set and the connection of the ringing signal sensing means to the telephone line, first relay means connected to the first switch means, said first relay means being operated through a network by a ringing signal on the telephone line, a first one shot logic means connected to the line and energized by a ringing signal, timer means connected to and energized by the one shot logic means, said timer means being connected to the first relay means and energizing the relay means after a time delay, tone generator means connected to the telephone line through normally open second switch means, second relay means operating said second switch means, said second relay means being energized without delay through a second one shot logic means connected to the timer means whereby said second switch means is closed and connects the tone generator to the line in advance of closing of the first switch means, normally open off hook switch means connected to the first relay means whereby lifting the handset off the hook establishes a circuit through the first relay means as long as the handset is off the hook.

* * * * *